(12) United States Patent
Ali et al.

(10) Patent No.: US 10,620,941 B2
(45) Date of Patent: Apr. 14, 2020

(54) UPDATING AND ROLLING BACK KNOWN GOOD STATES OF INFORMATION HANDLING SYSTEMS

(71) Applicant: Dell Products L.P., Round Rock, TX (US)

(72) Inventors: Rizwan Ali, Cedar Park, TX (US); Dharmesh M. Patel, Round Rock, TX (US); Ravikanth Chaganti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 211 days.

(21) Appl. No.: 15/484,157

(22) Filed: Apr. 11, 2017

(65) Prior Publication Data

US 2018/0293066 A1 Oct. 11, 2018

(51) Int. Cl.
*G06F 8/656* (2018.01)
*G06F 11/14* (2006.01)
*G06F 11/30* (2006.01)
*G06F 8/65* (2018.01)
*G06F 11/32* (2006.01)
(Continued)

(52) U.S. Cl.
CPC .............. *G06F 8/656* (2018.02); *G06F 8/65* (2013.01); *G06F 9/4411* (2013.01); *G06F 11/1433* (2013.01); *G06F 11/301* (2013.01); *G06F 11/302* (2013.01); *G06F 11/3051* (2013.01); *G06F 11/328* (2013.01); *G06F 8/70* (2013.01); *G06F 2201/865* (2013.01)

(58) Field of Classification Search
CPC .......... G06F 8/65; G06F 8/656; G06F 9/4411; G06F 11/3051; G06F 11/328; G06F 8/70; G06F 11/301
See application file for complete search history.

(56) References Cited

U.S. PATENT DOCUMENTS

| 8,645,946 | B2 * | 2/2014 | Wookey | G06F 8/658 |
| | | | | 717/175 |
| 2004/0261070 | A1 * | 12/2004 | Miller | G06F 8/71 |
| | | | | 717/170 |

(Continued)

*Primary Examiner* — Jaweed A Abbaszadeh
*Assistant Examiner* — Gayathri Sampath
(74) *Attorney, Agent, or Firm* — Jackson Walker L.L.P.

(57) ABSTRACT

A disclosed system generates a baseline configuration manifest indicative of a known good state of a plurality of information handling modules. Configuration update information indicating updates to the modules and dependencies between or among the information handling modules is received. The information handling system may then be updated in accordance with the configuration update information. The baseline configuration manifest may include a plurality of module manifests corresponding to the plurality of information handling modules and updating the information handling system may include updating the one or more information handling modules in a sequence determined by update sequence information. The configuration update information may include one or more update payloads corresponding to one or more of the information handling modules. In such cases, updating the information handling system may include providing each of update payload to its corresponding information handling module.

21 Claims, 8 Drawing Sheets

(51) Int. Cl.
    *G06F 9/4401*    (2018.01)
    *G06F 8/70*      (2018.01)

(56) References Cited

U.S. PATENT DOCUMENTS

| | | | |
|---|---|---|---|
| 2005/0097543 A1* | 5/2005 | Hirayama | G06F 8/65 717/168 |
| 2008/0155526 A1* | 6/2008 | Gokhale | G06F 8/62 717/169 |
| 2010/0205421 A1* | 8/2010 | Campbell | G06F 11/1417 713/2 |
| 2010/0313191 A1* | 12/2010 | Yin | G06F 8/65 717/168 |
| 2013/0054601 A1* | 2/2013 | Whitlock | H04L 41/085 707/737 |
| 2014/0059530 A1* | 2/2014 | Banavalikar | G06F 9/4406 717/170 |
| 2016/0117161 A1* | 4/2016 | Parthasarathy | H04L 67/06 717/171 |
| 2017/0329596 A1* | 11/2017 | Butler | G06F 8/65 |

\* cited by examiner

```
{
    "title": "Hardware Inventory",
    "description": "Hardware Inventory repository",
    "type": "object",
    "properties": {                        ← 156
        "id": {
            "description": "The unique identifier of the hardware component",
            "type": "integer"
        },
        "name": {
            "description": "Name of the component",
            "type": "string"
        },
        "quantity": {
            "type": "number",
            "minimum": 0,
            "exclusiveMinimum": true
        },
        "servers": {
            "description":"Server models in which this hardware component exist"
            "type": "array",
            "items": {
                "type": "string"
            },
            "minItems": 1,
            "uniqueItems": true
        }
    },                                                           ← 154
    "required": ["id", "name", "quantity"]   ← 157
}
```

FIGURE 3

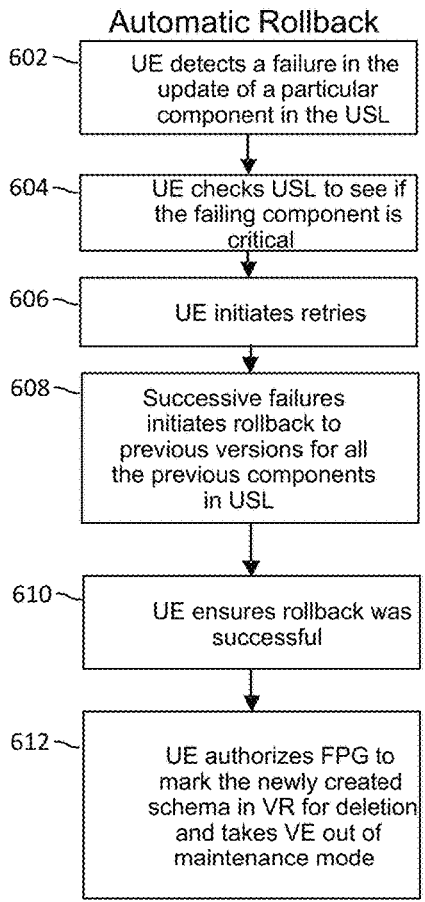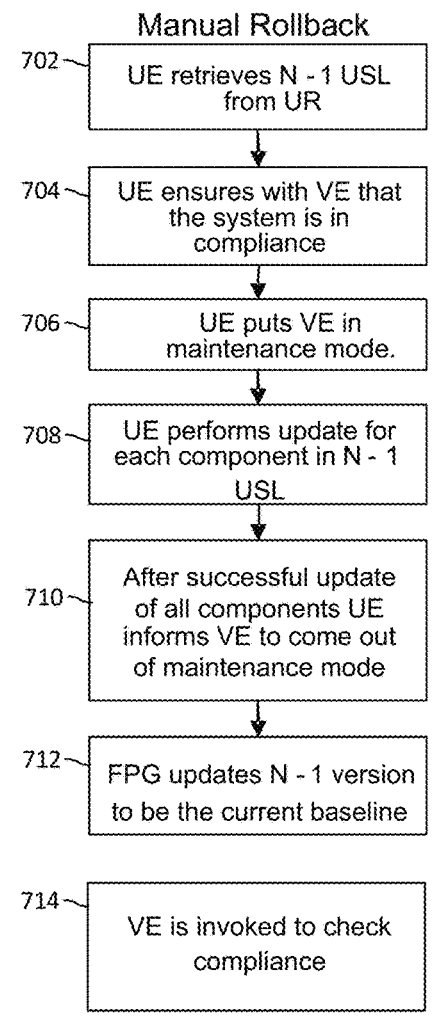
FIGURE 8
FIGURE 9

UPDATING AND ROLLING BACK KNOWN GOOD STATES OF INFORMATION HANDLING SYSTEMS

TECHNICAL FIELD

The present disclosure relates in general to managing enterprise class information handling systems and, more particularly, managing solution level configurations of such systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The importance of information technology (IT), which refers to the use of information handling systems to acquire, access, analyze, generate, and transmit data, especially in the context of a business or other enterprise, has increased dramatically with the proliferation of broadband communication infrastructure, affordable and sophisticated network-aware mobile devices, computerized applications for business and consumers, and oceans of data generated by such applications. Data centers came into existence as enterprises heavily invested in IT quickly recognized the need to create specialized facilities and resources to house and manage information handling systems and related infrastructure and components.

The architecture of early data centers was generally silo-like or vertical, with IT resources implemented in a non-shared landscape for a specific and limited application or objective. Vertically oriented data centers typically resulted in high capital costs, high operating costs, low utilization, poor interoperability, ad hoc management, and one-dimensional security. Horizontal data centers, characterized by the use of at least some degree of virtualization and/or co-located data center facilities, evolved in response to scaling and cost issues inherent in the vertical data center model. While reducing costs and improving utilization, horizontal data centers inherited the fragmented nature of the original data centers, wherein processing resources are acquired separately from storage resources which are acquired separately from networking resources and so forth.

SUMMARY

A disclosed managed infrastructure platform includes features for managing information handling systems. Although applicable to all types of information handling system, infrastructure services manager features may be described in the context of converged infrastructure systems, hyper-converged infrastructure systems, hybrid cloud systems, and other types of enterprise-scale information handling systems, all of which may be collectively or generically referred to herein as managed infrastructure systems. Disclosed infrastructure services manager features include features that address various IT objectives including system consolidation, improved utilization of resources, and lower costs. Managed infrastructure systems support these objectives by implementing pools of compute, storage, and networking resources that can be shared by multiple applications and managed in a collective manner using policy-driven processes.

Converged infrastructure systems include information handling systems in which two or more distinct information handling resources are interconnected and validated by a vendor prior to deployment. A non-limiting example of a converged infrastructure system might comprise a modular chassis that includes one or more modular compute enclosures, one or more network attached storage devices, and one or more switching resources. Hyper-converged systems include systems in which the virtualization of compute resources and the virtualization of storage resources are integrated into a software defined environment. Hyper-converged systems may be implemented as a group of off-the-shelf rack servers, each of which includes processing resources and direct attached storage resources.

Whether implemented in an enterprise's premises-based data center or, increasingly, a third party data center for providing outsourced, co-located, and/or cloud-based IT resources to an enterprise, managed infrastructure systems facilitate consolidation of IT resources and simplify IT management while facilitating improvements in utilization and cost reductions. However, the introduction of readily available, managed infrastructure systems has occurred comparatively recently. Accordingly, resources and techniques for managing the building, deployment, and operation of managed infrastructure systems are yet to be fully implemented and optimized.

Subject matter disclosed in this and other applications address numerous challenges associated with ensuring that: (a) managed infrastructure systems are properly built before being deployed, (b) properly-built managed infrastructure systems are properly deployed, and (c) properly-deployed managed infrastructure systems remain operational and continue to deliver an expected level of performance.

In accordance with subject matter disclosed herein, a system and method generate a baseline configuration manifest indicative of a known good state of a plurality of information handling modules for an information handling system. Configuration update information may be received wherein the update information includes or indicates updates to one or more of the information handling modules and dependencies between or among the information handling modules. Based on the configuration update information and the baseline configuration manifest, update sequence information may be generated. The information handling system may then be updated in accordance with the configuration update information and the update sequence information.

The baseline configuration manifest may include a plurality of module manifests corresponding to the plurality of information handling modules and updating the information handling system may include updating the one or more information handling modules in a sequence determined by the update sequence information. The configuration update information may include one or more update payloads corresponding to one or more of the information handling modules. In such cases, updating the information handling system may include sending each update payload to its corresponding information handling module.

Responsive to an update exception generated during updating of the information handling system, a determination of whether the information handling solution supports automated roll back is made. Responsive to determining that the information handling solution supports automated roll back, the system may automatically roll back a current module and all preceding modules indicated in the update sequence information.

The baseline configuration manifest may be updated in accordance with the configuration update information responsive to successfully updating each of the modules in the update sequence list. The updated baseline configuration manifest may be committed as a current baseline responsive to successful completion of the updating of the information handling system. The information handling solution may be rolled back to a prior baseline configuration version responsive to administrator input.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates an exemplary manifest for a hardware validator module;

FIG. 8 illustrates a flow diagram of an automatic configuration rollback method; and FIG. 9 illustrates a flow diagram of an administrator initiated configuration rollback method.

DETAILED DESCRIPTION

Figure 1:
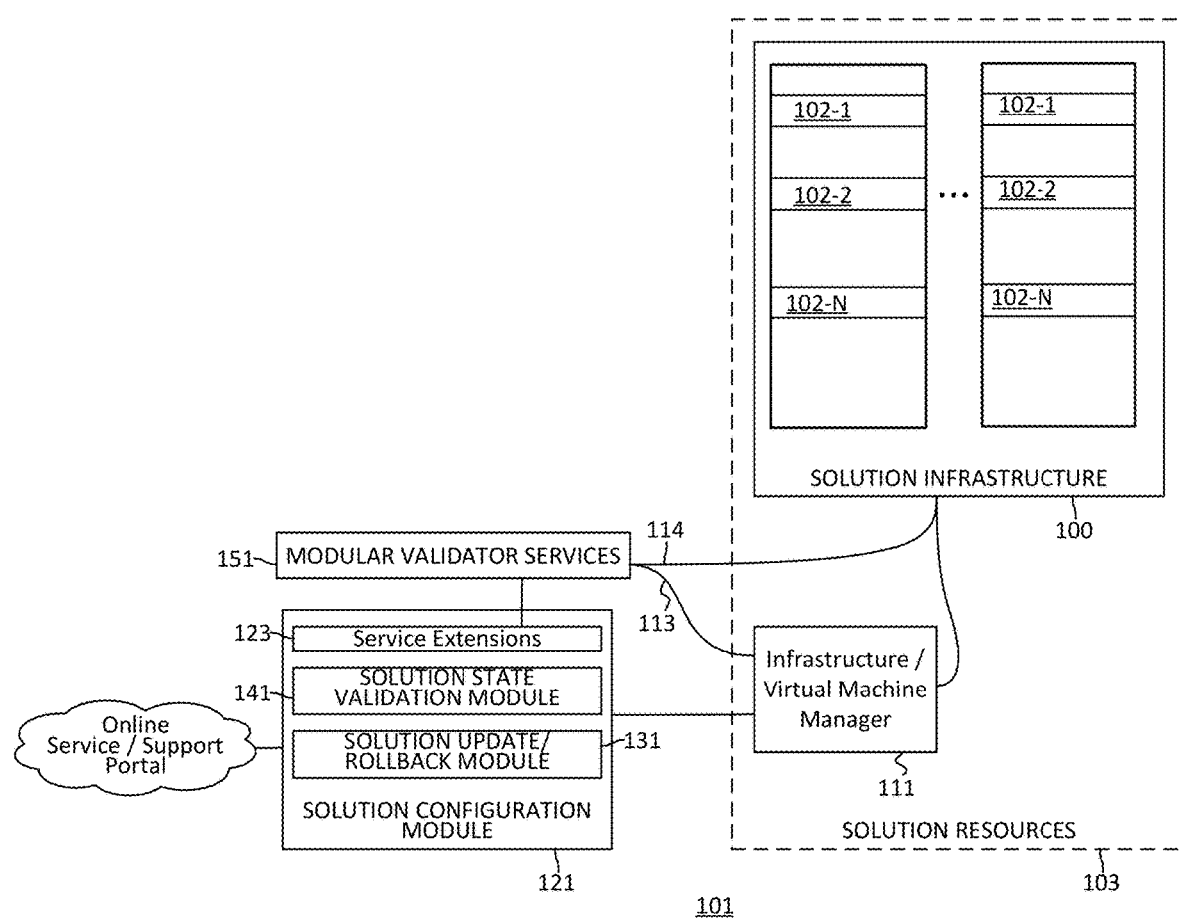
FIG. 1 illustrates a block diagram of a managed infrastructure platform including a solution configuration module.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, information handling modules may encompass information handling resources as well as software resources including software resources for managing information handling systems.

For the purposes of this disclosure, the terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), Bluetooth, ISO 14443, ISO 15693, or other suitable standard), personal area networks (PAN) (e.g., Bluetooth), local area networks (LAN), wide area networks (WAN), narrowband personal communications services (PCS), mobile telephony technologies, broadband PCS, circuit-switched cellular, cellular digital packet data (CDPD), radio frequencies, such as the 800 MHz, 900 MHz, 1.9 GHz and 2.4 GHz bands, infra-red and laser.

Turning now to the drawings, FIG. 1 illustrates a managed infrastructure platform 101 in which solution information handling resources 103, more simply referred to herein as solution resources 103, are coupled to a solution configuration module 121. The solution resources 103 illustrated in FIG. 1 include all hardware and software included within solution information handling resource infrastructure 100, more simply referred to herein as solution infrastructure 100, as well as a management resource identified in FIG. 1 as Infrastructure/Virtual Machine Manager 111. The solution infrastructure 100 illustrated in FIG. 1 includes a plurality of information handling resources 102-1, 102-2, and 102-3 included within a rack, chassis, enclosure, or other type of structural support 110 that information handling resources 102 may share in common.

In converged infrastructure system embodiments of solution infrastructure 100, information handling resources 102-1, 102-2, and 102-3 may each correspond to different types of information handling resources, provide different functions, and originate from different manufacturers. These disparate and heterogeneous information handling resources may be pre-configured with a validated infrastructure by a supplier or vendor. In converged infrastructure system embodiments, solution infrastructure 100 may be referred to herein as converged infrastructure system 100.

In hyper-converged system embodiments of solution infrastructure 100, information handling resources 102-1, 102-2, and 102-3 may represent different instances of a rack server or another off-the-shelf compute component, each of which includes compute resources and direct attached storage. These similar and homogenous information handling resources may be pre-configured with a validated infrastructure by a supplier or vendor. In hyper-converged system embodiments, solution infrastructure 100 may be referred to herein as hyper-converged system 100. In addition, converged infrastructure system embodiments and hyper-converged system embodiments of solution infrastructure 100 may be collectively or generically referred to herein as managed infrastructure systems 100.

Although FIG. 1 illustrates a solution infrastructure 100 with three information handling resources 102, it will be readily appreciated that, whether implemented as a converged infrastructure system, a hyper-converged system, or another type of system, solution infrastructure 100 may include multiple instances of information handling resources 102-1, 102-2, and/or 102-3, as well as additional types of information handling resources not depicted in FIG. 1.

Whether implemented as a converged infrastructure system, a hyper-converged system or another type of system, the infrastructure of solution infrastructure 100 may include, in addition to the physical hardware components, any and all software and/or firmware components, including BIOS firmware, operating system software, hypervisor software, and/or containerization software, as well as any management resources on any one or more of the information handling resources 102.

Although not depicted in FIG. 1, the rack or chassis 110 as well as any of the one or more of the information handling resources 102 may include a corresponding management resource. Such management resources may by referred to as service processors, remote access controllers, baseboard management controllers, and/or derivatives thereof. Such management resources may be communicatively coupled to centralized or distributed remote management resources represented in FIG. 1 as Infrastructure/Virtual Machine Manager 111. The managed infrastructure platform 101 may enable any such management resources within solution infrastructure 100 to communicate with Infrastructure/Virtual Machine Manager 111 "out-of-band" with respect to communications among information handling resources 102.

For embodiments of solution infrastructure 100 that support virtualized, containerized, or other types of abstracted information handling resources, Infrastructure/Virtual Machine Manager 111 may include or encompass resources for managing such abstracted resources. These resources may include, as examples, infrastructure manager resources, virtual machine manager resources, or microservice/container clustering and/or orchestration frameworks, depending upon the implementation Infrastructure/Virtual Machine Manager 111 may include or support functionality found in any of various publically available management resources, including as non-limiting examples, Dell Active System Manager system management resources from Dell, Inc., a vCenter server and/or VMware/Vsphere management resources from VMware, a subsidiary of Dell Technologies, Virtual Machine Manager (VMM)/System Center resources from Microsoft, Apache Mesos cluster management resources from the Apache Software Foundation, Kubernetes container management/orchestration resources from the Cloud Native Computing Foundation, Docker Swarm container clustering resources from Docker, Inc., and vRealize cloud automation resources from VMware/Dell Technologies.

The Infrastructure/Virtual Machine Manager 111 may be configured to interact with one or more management services that may provide Infrastructure/Virtual Machine Manager 111 with information or services that improve the ability of Infrastructure/Virtual Machine Manager 111 to manage solution infrastructure 100. The Infrastructure/Virtual Machine Manager 111 of FIG. 1 is illustrated coupled to solution configuration module 121 for facilitating the determination and management of the solution configuration.

The solution configuration module 121 illustrated in FIG. 1 includes a solution update/rollback module 131, a solution state validation module 141, and service extensions 123 enabling modular validator services 151 to communicate with solution configuration module 121. The modular validator services 151 are illustrated in FIG. 1 communicate with solution infrastructure 100 via multiple alternative communication paths including a direct communication path 114 and a communication path 113 that is routed through Infrastructure/Virtual Machine Manager 111. FIG. 1 further illustrates an online service/support portal 160 that enables remote administrators and developers to communicate with solution configuration module 121.

Figure 2:
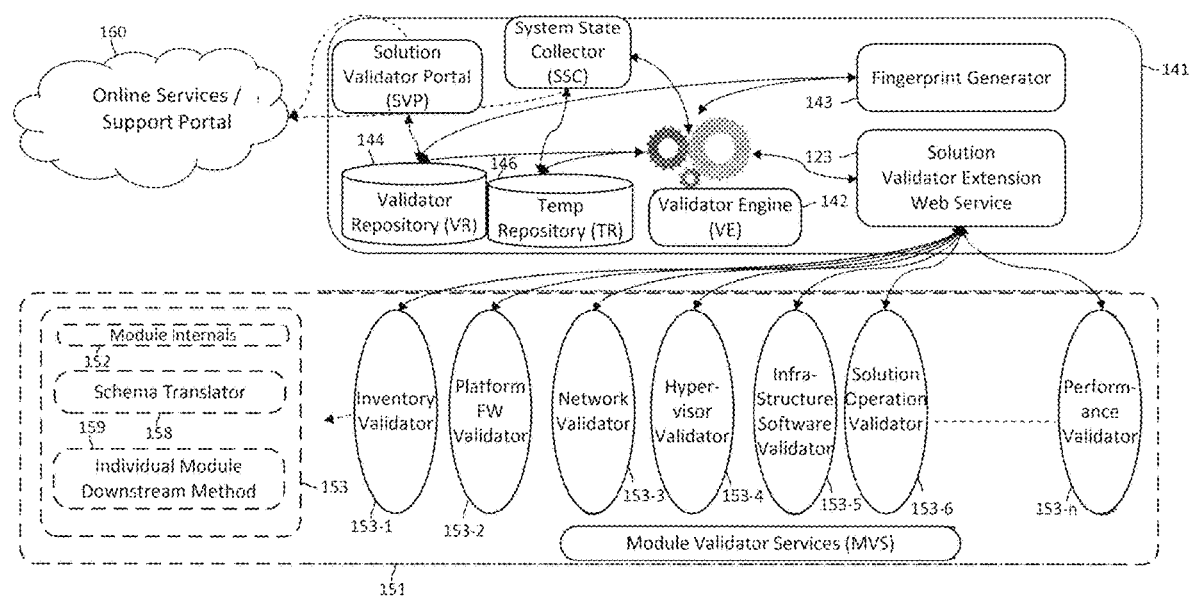
FIG. 2 illustrates a block diagram detailing the state validation module in the solution configuration module of FIG. 1.

Referring now to FIG. 2, additional detail of the solution state validation module 141 is illustrated. The solution state validation module 141 illustrated in FIG. 2 is configured to discover and capture a known good state (KGS) of solution infrastructure 100 and/or solution resources 103. A validator engine 142 monitors key configuration settings and health parameters of solution infrastructure 100 to ensure that solution infrastructure 100 remains in compliance with an approved configuration.

The validator engine 142 illustrated in FIG. 2 beneficially provides a resource for quantifying an instance of a solution's configuration. For each of category of a solution's configuration state, the applicable schema may define or indicate required parameters and observed parameters. The validator engine 142 may facilitate an orchestrated collection of configuration settings from a wide variety of hardware and software components in a Private/Hybrid Cloud or virtualized solution to determine the solution's health by comparing observed configuration versus the baseline. By incorporating corrective action scenarios, the solution state validation module 141 may be extended to perform or orchestrate self-heal mechanisms.

The solution state validation module 141 illustrated in FIG. 2 includes validator engine 142, extensible web services 123, a fingerprint generator 143, a validator repository 144, and a web portal 160. The solution state validation module 141 provides a framework enabling the solution's various modules to communicate configuration information and dependency information in a coordinated manner. As shown in FIG. 2, each of a group of module validators 153 is configured to communicate a particular aspect of the solutions configuration to solution state validation module 141 via Web service extension API 123. The module validators 153 illustrated in FIG. 2 include a hardware validator 153-1, also sometimes referred to as inventory validator 153-1, a platform/firmware validator 153-2, a network validator 153-3, a hypervisor validator 153-4, an infrastructure software validator 153-5, a solution operation validator 153-6, and a performance validator 153-n. The particular group of module validators 153 illustrated in FIG. 2 is representative of module validators that may be included. Other instances may include more, fewer, and/or different module validators 153 than those shown in FIG. 2.

Consistent with the modular nature of modular validator services 151, FIG. 2 illustrates a generic module validator 153 including a schema translator 158 that abstracts a downstream validator method 159 from each individually configured module 152. The downstream method 159 supports GET and SET methods that enable the modular validator and validator engine to exchange data.

The validator engine 142 may be configured to capture configuration settings for each module validator 153 via Web service extension API 123, which may be configured to communicate with any or all of the module validators 153. In at least one embodiment, each modular validator service 153 constitutes a representational state transfer (REST) compliant resource that supports one or more RESTful methods including a GET method and a SET method. Configuration data corresponding to each module validator 153 may be passed between validator engine 142 and the applicable module validator 153 by way of a schema (not depicted in FIG. 2), which may be implemented in a language independent data format such as JavaScript Open Notation (JSON) or a suitable alternative. Referring to FIG. 3, a hardware schema 154 is illustrated as an example schema. As illustrated in FIG. 3, hardware schema 154 identifies various properties 156 and requirements 157 of the applicable resource. In at least one embodiment, a fully compliant resource complies with all properties 156 and requirements 157 indicated in the schema. A required-compliance resource complies with all requirements listed in the schema and may comply with all listed properties, while a non-compliant resource does not comply with one or more required items.

The solution state validation module 141 illustrated in FIG. 2 includes a fingerprint generator 143 that may be configured to capture a point-in-time configuration of solution infrastructure 100, store a representation, referred to herein as the solution's fingerprint, of the captured configuration against a specific version number in the validator repository 144. This version of the configuration may be referred to as the baseline configuration or, more simply, the baseline and the fingerprint representing the baseline configuration may be referred to as the baseline fingerprint.

The validator engine 142 may monitor the solution infrastructure 100 and may periodically perform compliance checks against any one or more of the configuration categories via the applicable validator 153. Compliance check results may be displayed or otherwise presented via portal 160. In at least one embodiment, compliance check may report a summary result selected from a small group of results that includes, in at least some embodiments, a fully-compliant status, a required-compliance status, and a non-compliant status, each of which might be represented visually with a color code as GREEN, YELLOW, and RED for fully compliant, required-compliance, and non-compliant.

Figure 4:
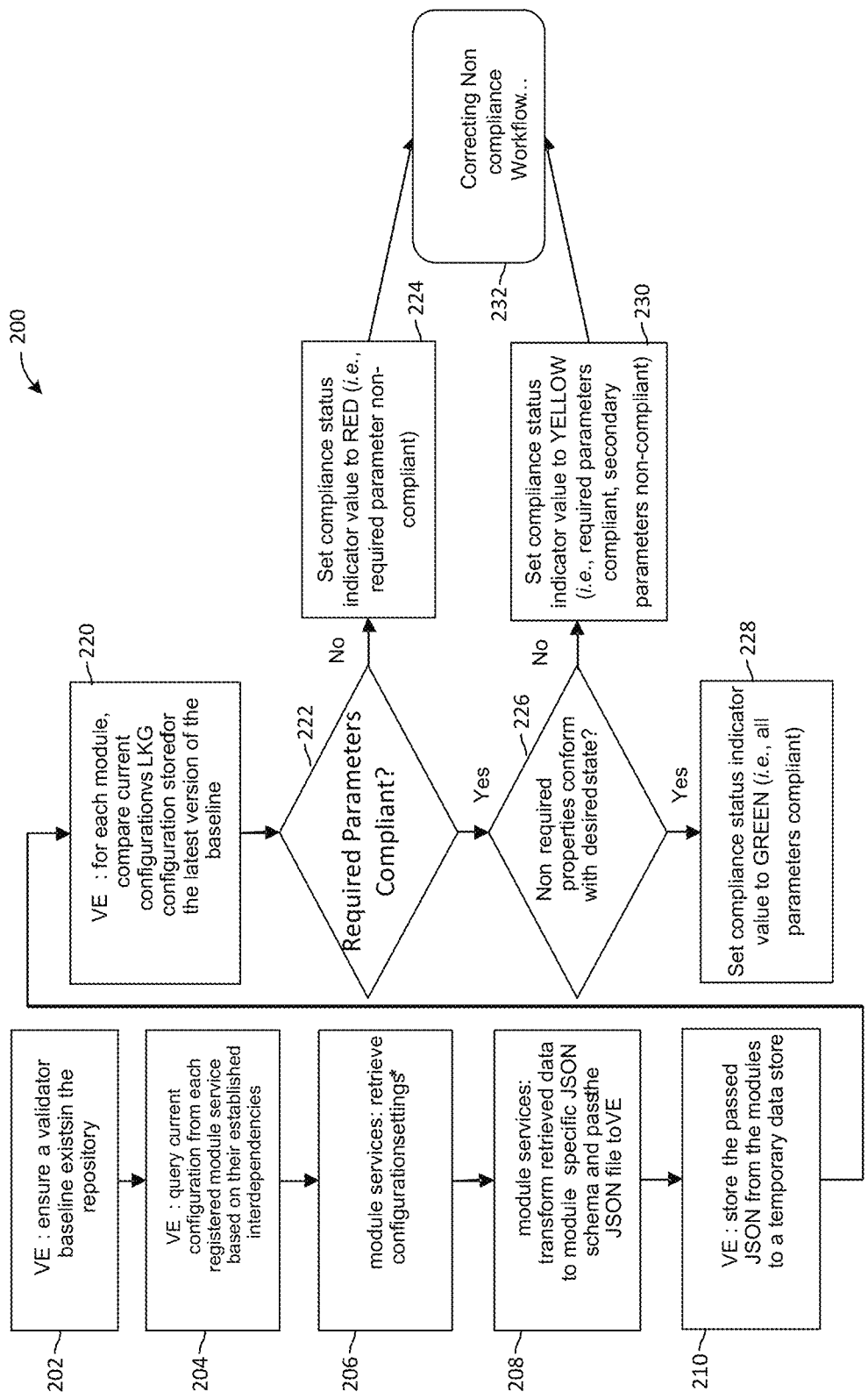
FIG. 4 illustrates a method for verifying the compliance status of an information handling solution.

FIG. 4 illustrates a flow diagram of a configuration compliance check method 200 that may be performed by solution state validation module 141 and validator engine 142 in cooperation with module validator 153. As illustrated in FIG. 4, method 200 includes validator engine 142 ensuring (operation 202) a valid baseline configuration is stored in validator repository 144 or another storage resource accessible to validator engine 142. The validator engine 142 may then query, access, or otherwise obtain (operation 204) current configuration information from each validator module 153. An inventory of validator modules 153 may be maintained via registry values or in another fashion. If a schema for a particular resource indicates a dependency on one or more other resources, the other such one or more resources may be validation checked as part of the validation of the particular resource, which may require a validation check for one category of module validator to invoke one or more other category.

When requested by validator engine 142, a module validator 153 retrieves (operation 206) the applicable configuration data. Certain modules 153 may have inbuilt mechanisms to detect a drift. In such cases, the baseline configuration manifest schema can be provided to the module, and the module can use the schema to directly report any non-compliance. Each module validator 153 may then transform (operation 208) retrieved data in accordance with a module-specific JSON schema, such as the schema 154 illustrated in FIG. 3, and the resulting file to validator engine 142.

The validator engine 142 may then store (operation 210) the information included in the file in a temporary storage resource such as the temporary repository 146 illustrated in FIG. 2. For each of the module validators 153, the validator engine 142 may compare (operation 220) the current configuration vs the last known good configuration stored in the latest version of the baseline.

The method 200 illustrated in FIG. 4 then determines (operation 222) whether required properties of the module are non-compliant with respect to the last known good state. If any required properties are non-compliant, a non-compliant status indicator associated with the module is set (operation 224). In at least one embodiment, the non-compliant status indicator may be associated with a color or value indicative of a significance or priority of the applicable non-compliance. One such embodiment may establish three status levels, e.g., RED, YELLOW, and GREEN, and three corresponding status values. In such an embodiment, the RED status level may be used to indicate that the module is non-compliant with respect to a required parameter.

If the module is compliant with respect to required properties, a full compliance status, e.g., GREEN, may be indicated (operation 228) if a determination is made (operation 226) that all non-mandatory or secondary properties identified by the schema are compliant with any indicated values or states. If one or more of the non-mandatory properties are non-compliant, an intermediate status indicator, e.g., YELLOW, may be displayed (operation 230) to indicate that the module has a required-compliance status. In the case of non-compliance or required-compliance status, method 200 may further include performing a non-compliance workflow (operation 232).

Figure 5:
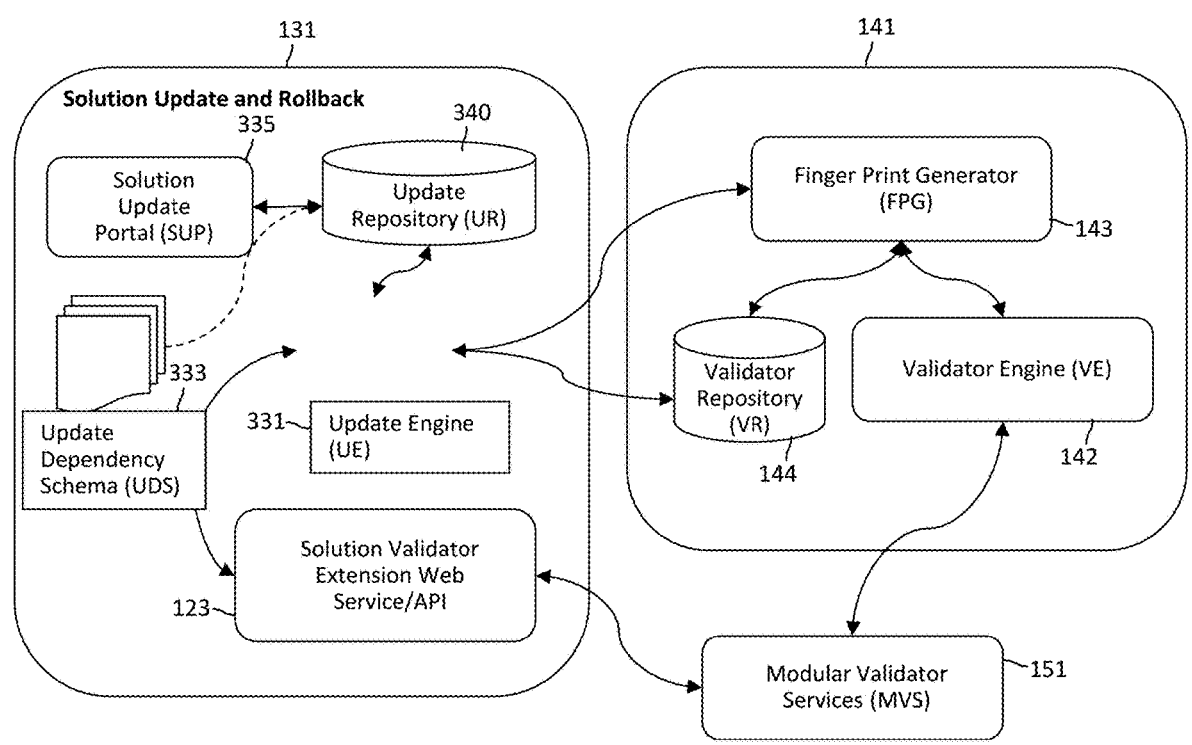
FIG. 5 illustrates a block diagram of a configuration update and rollback module for use with an information handling solution.

FIG. 5 illustrates solution/update rollback module 131 communicatively coupled to solution state validation module 141. The solution update and rollback module 131 is configured to ensure a well-defined and orchestrated update process for solution infrastructure 100. After an update is deployed, solution infrastructure 100 must maintain its health, compliance and performance.

In the event of any post-deployment issues with performance, availability, or another metric, the ability to roll back a solution to a prior state, either at a hardware/software component level or at a solution level may become paramount. The solution update/roll back module 131 may be configured to access or otherwise leverage the baseline configuration information maintained in validator repository 144 by solution state validation module 141 to enable a solution to go back to a previous baseline configuration when warranted. A configuration update that was successfully verified in the lab and successfully installed or deployed to the solution may, nevertheless, exhibit issues with performance or another metric. In such cases, it may be highly desirable to restore the solution to a previous KGS until the issue can be addressed.

As illustrated in FIG. 5, solution update and rollback module 131 includes an update engine 331 that works in conjunction with solution state validation module 141 and module validator services 151. An update package may be provided to update engine 331 via online support portal 160. The structure or format of the update package may comply with a pre-determined standard or protocol. The update package may be pre-validated and lab tested to ensure that the update package accounts for any and all interoperability and interdependencies that the solution infrastructure 100 may have.

The update package may include an update dependency schema 333 that identifies the solution components to be updated and their inter-dependencies, if any. In addition, update package may include software, firmware, and driver updates as well as configuration settings updates and updates for solution state validation module 141, module validator, and schema/manifest updates for modules 153. Update engine 331 may communicate with solution state validation module 141 and the modular validator services 151.

Figure 6:
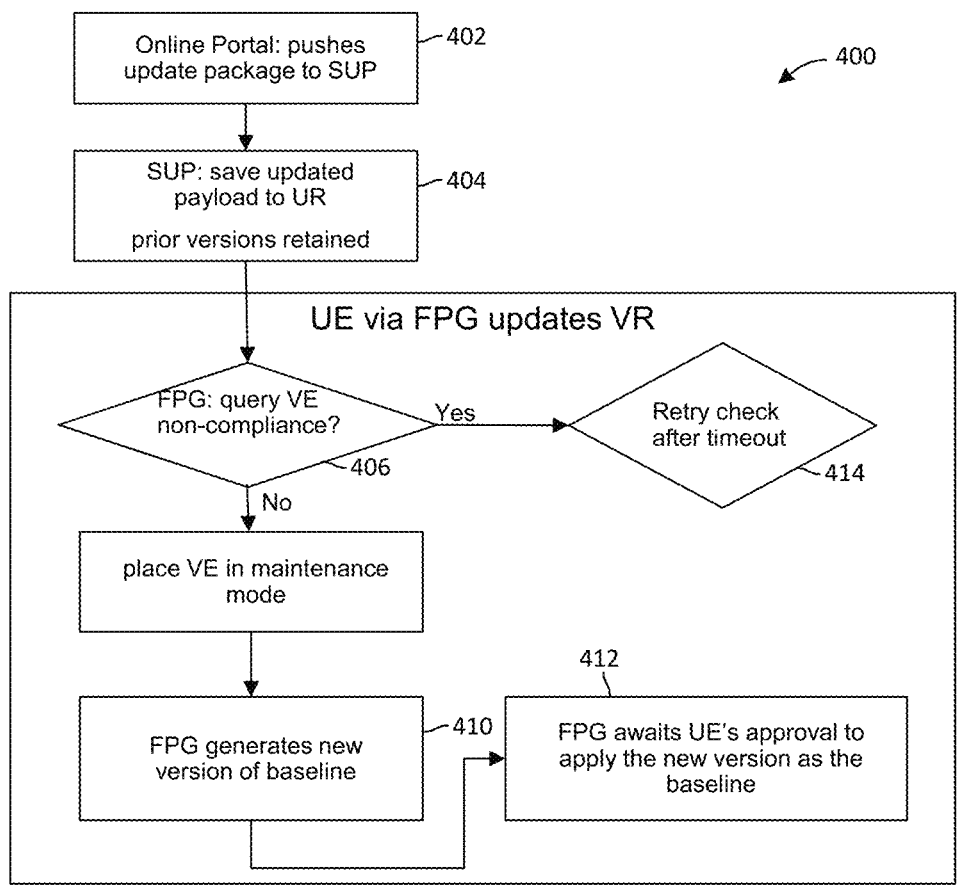
FIG. 6 illustrates a flow diagram of a solution configuration update method.

FIG. 6 illustrates a flow diagram of a method 400 for pushing configuration updates to solution infrastructure 100 and for generating new baselines configurations. The method 400 illustrated in FIG. 6 begins with the online support portal 160 pushing (operation 402) an update package to the solution updated portal (SUP) 335. The solution update portal 335 saves (operation 404) update payloads, which may include driver updates, firmware updates, BIOS updates, operating system updates, hypervisor updates, and the like, to an update repository 340 while retaining prior versions of the solution configuration.

The update engine 331 then works in conjunction with finger print generator 143 of solution state validation module 141 to update the validator repository 144. Initially, the finger print generator 143 may query validator engine 142 to determine whether solution infrastructure 100 is compliant with any of one or more possible baseline configurations. If the validator repository 144 indicates that solution infrastructure 100 is currently non-compliant, the update process may pause or halt (operation 414) until the non-compliance is resolved, thereby preventing updates of non-compliant solutions.

If the validator engine 142 does not report any non-compliance in operation 406, the update engine 331 may automatically transition (operation 408) validator engine 142 to a maintenance mode to prevent validator engine 142 from initiating any validations while an update is in progress. The finger print generator 143 may then generate a new version (operation 410) of the baseline fingerprint. While the update engine 331 proceeds with implementing the update payloads, the finger print generator 143 may await (operation 412) approval from update engine 331 before committing the baseline configuration to validator repository 144.

Figure 7:
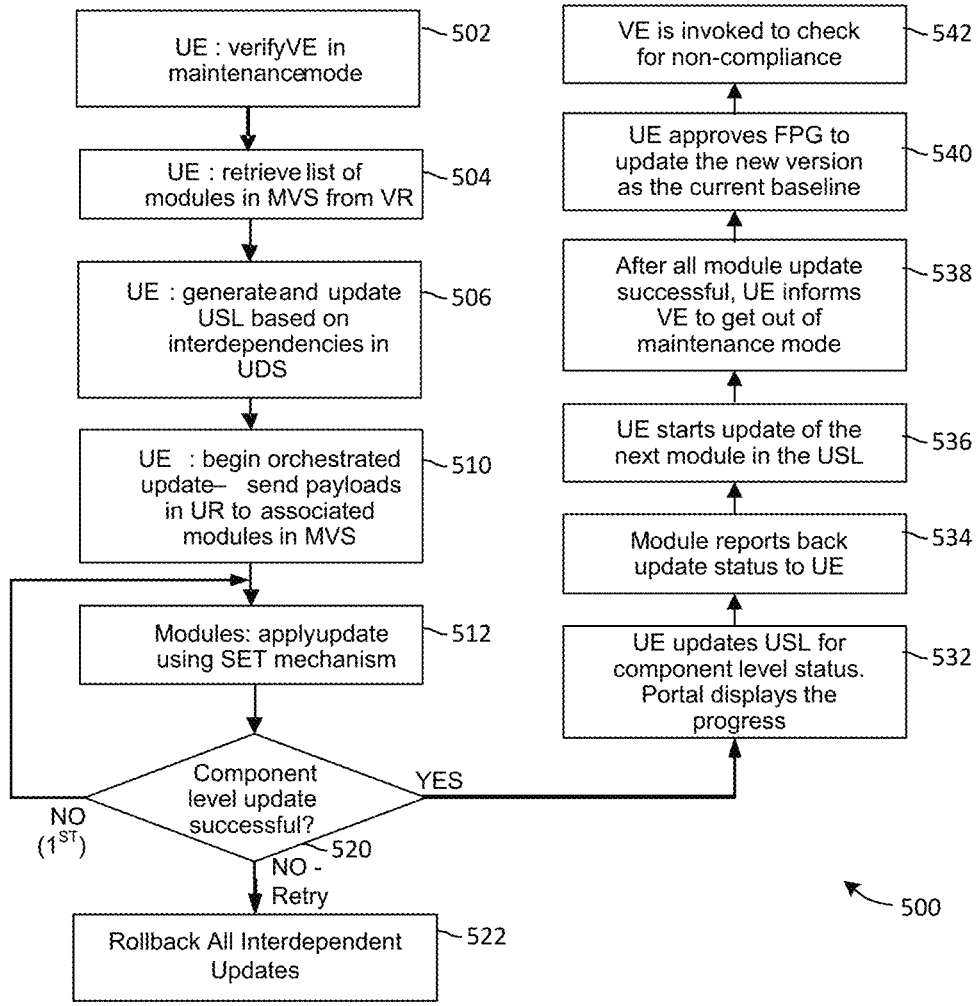
FIG. 7 illustrates a flow diagram of an orchestrated configuration update method.

Referring now to FIG. 7, a flow diagram illustrates an orchestrated update method 500. The method 500 illustrated in FIG. 7 begins with update engine 331 verifying (operation 502) validator engine 142 to ensure validator engine 142 is in maintenance mode. The update engine 331 may then retrieve (operation 504) a list of module validators in modular validator services 151 from validator repository 144. The update engine 331 may generate or update (operation 506) an update sequence list based on interdependencies in the update dependency schema 333. The update engine 331 may begin the orchestrated update by sending (operation 510) payloads in the update repository 340 to corresponding module validators 153. Each of the module validators may apply (operation 512) any update included in the update repository 340 received from update engine 331. Modules 153 may apply updates using their underlying SET mechanism and, once the update has been applied, the module 153 may report back to update engine 331 with the status of the update. If, in operation 520, the update engine determines that all modules have successfully updated, method 500 proceeds to operation 532. If one or more components does not update successfully, method 500 may first attempt to loop back to operation 512 to re-apply the one or more updates again. If the retry successfully updates the applicable module, method 500 may proceed to operation 532. If however the retry fails, meaning that at least one module has failed two or more times, the method 500 illustrated in FIG. 7 proceeds to operation 522, in which all interdependent updates are rolled back to their prior levels.

The update engine 331 may then update (operation 532) the update sequence list with the status of the update for the applicable module. The portal 160 may be configured to monitor the status and indicate progress updates. The module may report back (operation 534) update status to update engine 331. If a component that has dependencies on others fails, an attempt to retry the update may be made. If the update cannot be made, the configuration may roll back all dependent updates.

The update engine 331 may then start (operation 536) update of the next module in the UPDATE SEQUENCE LIST. Once all updates have successfully completed, update engine 331 may inform (operation 538) validation engine 143 to exit maintenance mode and finger print generator 143 to update (operation 540) the new version to be the current baseline before invoking validator engine 142 to check for non-compliance.

Referring now to FIG. 8, a flow diagram illustrates a method 600 for automatically rolling back a solution configuration. The method 600 illustrated in FIG. 8 begins with update engine 331 detecting (operation 602) a failure in the updated of a particular module of the update sequence list. The update engine 331 may check (operation 604) the update sequence list to determine whether the failure is associated with a critical component. Update engine 331 may initiate one or more attempts to retry. If successive failures are detected, rollback to a previous version for all of the earlier-in-sequence components of the update sequence list may be initiated. Thus, if a failure is detected during update of a third component listed in the update sequence list, successive failures of the third component will trigger a rollback of the first and second components.

After a rollback of one or more components is performed, the update engine 331 may ensure (operation 610) that the rollback completed successfully. The update engine 331 may authorize finger print generator 143 to mark a newly created baseline validator repository 144 for deletion and takes validator engine 142 out of maintenance mode.

Referring now to FIG. 9, a flow diagram illustrates a method 700 for performing an administrator-initiated is described. As illustrated in FIG. 9, method 700 includes retrieving (operation 702) the previous version of the update sequence list from the update repository. The previous version may referred herein as the "N–1" version where N indicates the current version. The update engine may then confirm (operation 704) with the validator engine that the solution is in compliance before the update engine transitions (operation 706) the validator engine to a maintenance mode, i.e., a mode in which the validator engine does not monitor for baseline configuration compliance.

The update engine may then perform (operation 708) an update using each component in the N–1 update sequence list. Once all the updates have successfully completed, the update engine informs, the update engine information (operation 710) or otherwise signals the validator engine to exit maintenance mode. The fingerprint generator may then record (operation 712) the N–1 version of the baseline configuration as the current version update to be the current baseline before the validator engine is subsequently invoked (operation 714) to perform a compliance check.

In at least one embodiment, a parameter in the update sequence list signifies whether automatic rollback for a particular module is supported or not. When a roll back is signaled, the update engine may determine whether to attempt the roll back automatically based on the parameter value. If automatic roll back is unavailable for one or more modules, the update engine may alert or otherwise inform the administrator, e.g., by generating a signal to inform the administrator that a roll back is signaled and that auto rollback is unavailable for one or more modules. In such situations, the administrator may elect to perform an administrator-initiated roll back.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method, comprising:
    detecting a configuration update package for an information handling solution, wherein the information handling solution includes a plurality of information handling modules;
    responsive to the detecting of the configuration update package, determining whether a current configuration of the information handling solution matches any of one or more solution fingerprints stored in a repository, wherein each of the one or more solution fingerprints includes configuration information indicative of a known good state of each of the plurality of information handling modules;
    responsive to determining the current configuration matches a particular solution fingerprint stored in the repository, performing configuration update operations, wherein the configuration update operations include:
    receiving configuration update information indicative of:
        updates to a group of information handling modules, wherein the group of information handling modules includes one or more of the plurality of information handling modules; and
        one or more configuration dependencies, each of which indicates a dependency between two or more of the plurality of information handling modules;
    generating update sequence information based on the configuration update information and the particular solution fingerprint;
    updating the group of information handling modules in accordance with the configuration update information and the update sequence information;
    validating the information handling solution after said updating, wherein validating includes validating each of the group of information handling modules and, for each handling module in the group of information handling modules associated with any of the one or more configuration dependencies, validating each additional information handling module indicated in the dependency; and
    responsive to determining the current configuration does not comply with any of the one or more solution fingerprints, pausing operation of the information handling solution until baseline configuration compliance is achieved.

2. The method of claim 1, wherein the particular solution fingerprint comprises a baseline configuration manifests, comprising a plurality of module manifests corresponding to the plurality of information handling modules and wherein updating the information handling solution comprises updating the plurality of information handling modules in a sequence determined by the update sequence information.

3. The method of claim 1, wherein the configuration update information includes one or more update payloads corresponding to one or more of the information handling modules and wherein updating the information handling solution includes installing each of the one or more update payloads to its corresponding information handling module.

4. The method of claim 3, further comprising:
    responsive to an update exception generated during the updating of the information handling solution, determining whether the information handling solution supports automated roll back; and responsive to determining that the information handling solution supports automated rollback, automatically rolling back a current module and all preceding modules indicated in the update sequence information.

5. The method of claim 4, further comprising, updating the particular solution fingerprint in accordance with the configuration update information.

6. The method of claim 5, further comprising committing the particular solution fingerprint as a current baseline responsive to successful completion of the updating of the information handling solution.

7. The method of claim 6, further comprising rolling back the information handling solution to a configuration indicated by a prior version of the particular solution fingerprint responsive to administrator input.

8. An information handling system, comprising:
a processor;
a network interface for communicating with management endpoints of a plurality of information handling modules in an information handling solution; and
a computer readable medium including processor executable instructions that, when executed by the processor, cause the processor to perform one or more operations comprising:
detecting a configuration update package for the information handling solution, wherein the information handling solution includes the plurality of information handling modules;
responsive to the detecting of the configuration update package, determining whether a current configuration of the information handling solution matches any of one or more solution fingerprints stored in a repository, wherein each of the one or more solution fingerprints includes configuration information indicative of a known good state of each of the plurality of information handling modules;
responsive to determining the current configuration matches a particular solution fingerprint stored in the repository, performing configuration update operations, wherein the configuration update operations include:
receiving configuration update information indicative of:
updates to a group of information handling modules, wherein the group of information handling modules includes one or more of the plurality of information handling modules; and
one or more configuration dependencies, each of which indicates a dependency between two or more of the plurality of information handling modules;
generating update sequence information based on the configuration update information and the particular solution fingerprint;
updating the group of information handling modules in accordance with the configuration update information and the update sequence information;
validating the information handling solution after said updating, wherein validating includes validating each of the group of information handling modules and, for each handling module in the group of information handling modules associated with any of the one or more configuration dependencies, validating each additional information handling module indicated in the dependency; and
responsive to determining the current configuration does not comply with any of the one or more solution fingerprints, pausing the information handling solution until baseline configuration compliance is achieved.

9. The information handling system of claim 8, wherein the particular solution fingerprint comprises a baseline configuration manifest comprising a plurality of module manifests corresponding to the plurality of information handling modules and wherein updating the information handling solution comprises updating the plurality of information handling modules in a sequence determined by the update sequence information.

10. The information handling system of claim 8, wherein the configuration update information includes one or more update payloads corresponding to one or more of the information handling modules and wherein updating the information handling solution includes sending each of the one or more update payloads to its corresponding information handling module.

11. The information handling system of claim 10, wherein the operations include:
responsive to an update exception generated during the updating of the information handling system, determining whether the information handling solution supports automated roll back; and
responsive to determining that the information handling solution supports automated rollback, automatically rolling back a current module and all preceding modules indicated in the update sequence information.

12. The information handling system of claim 11, wherein the operations include:
updating the particular solution fingerprint in accordance with the configuration update information.

13. The information handling system of claim 12, wherein the operations include:
committing the particular solution fingerprint as a current baseline responsive to successful completion of the updating of the information handling solution.

14. The information handling system of claim 13, wherein the operations include:
rolling back the information handling solution to a prior version of the particular solution fingerprint responsive to administrator input.

15. A non-transitory computer readable medium including processor executable instructions that, when executed by a processor, cause the processor to perform one or more operations comprising:
detecting a configuration update package for an information handling solution, wherein the information handling solution includes a plurality of information handling modules;
responsive to the detecting of the configuration update package, determining whether a current configuration of the information handling solution matches any of one or more solution fingerprints stored in a repository, wherein each of the one or more solution fingerprints includes configuration information indicative of a known good state of each of the plurality of information handling modules;
responsive to determining the current configuration matches a particular solution fingerprint stored in the repository, performing configuration update operations, wherein the configuration update operations include:
receiving configuration update information indicative of:
updates to a group of information handling modules, wherein the group of information handling modules includes one or more of the plurality of information handling modules; and
one or more configuration dependencies, each of which indicates a dependency between two or more of the plurality of information handling modules;

generating update sequence information based on the configuration update information and the particular solution fingerprint;

updating the group of information handling modules in accordance with the configuration update information and the update sequence information;

validating the information handling solution after said updating, wherein validating includes validating each of the group of information handling modules and, for each handling module in the group of information handling modules associated with any of the one or more configuration dependencies, validating each additional information handling module indicated in the dependency; and responsive to determining the current configuration does not comply with any of the one or more solution fingerprints, pausing the information handling solution until baseline configuration compliance is achieved.

16. The computer readable medium of claim 15, wherein the particular solution fingerprint comprises a baseline configuration manifest, comprising a plurality of module manifests corresponding to the plurality of information handling modules and wherein updating the information handling solution comprises updating the plurality of information handling modules in a sequence determined by the update sequence information.

17. The computer readable medium of claim 15, wherein the configuration update information includes one or more update payloads corresponding to one or more of the information handling modules and wherein updating the computer readable medium includes sending each of the one or more update payloads to its corresponding information handling module.

18. The computer readable medium of claim 17, wherein the operations include:

responsive to an update exception generated during the updating of the computer readable medium, determining whether the information handling solution supports automated roll back; and responsive to determining that the information handling solution supports automated rollback, automatically rolling back a current module and all preceding modules indicated in the update sequence information.

19. The computer readable medium of claim 18, wherein the operations include:

updating the particular solution fingerprint in accordance with the configuration update information.

20. The computer readable medium of claim 19, wherein the operations include:

committing the particular solution fingerprint as a current baseline responsive to successful completion of the updating of the computer readable medium.

21. The computer readable medium of claim 20, wherein the operations include:

rolling back the information handling solution to a prior version of the particular solution fingerprint responsive to administrator input.

\* \* \* \* \*